CHECKING SYSTEMS

Filed Dec. 30, 1955 2 Sheets-Sheet 1

INVENTOR.
RICHARD K. ORTHUBER
BY
George R. Gust
ATTORNEY

CHECKING SYSTEMS

Filed Dec. 30, 1955 2 Sheets-Sheet 2

INVENTOR.
RICHARD K. ORTHUBER
BY
George A. Gust
ATTORNEY

United States Patent Office 2,899,132

Patented Aug. 11, 1959

2,899,132

CHECKING SYSTEMS

Richard Kaspar Orthuber, Fort Wayne, Ind., assignor to International Telephone and Telegraph Corporation Application December 30, 1955, Serial No. 556,687

14 Claims. (Cl. 235—61.6)

This invention relates to checking systems and is particularly directed to means for automatically tabulating and summing prices, numbers of, or other information on large quantities of packages of regular and irregular shapes as in retail merchandise handling.

The present practice in handling merchandise in retail markets and the like consists of an operator handling each package, noting the information on price tags, and transferring such information to a cash register or other recording equipment. In grocery handling such procedures are time-consuming and costly. Efforts to facilitate handling and bundling are only partially effective.

While this invention is specifically discussed and described in connection with handling retail merchandise, it is to be understood that the principles are applicable to any line of endeavor wherein it is desired to distinguish between mixed articles.

The object of this invention is a machine for inspecting pieces of merchandise or packages, and recording or tabulating the information marked on the merchandise, without the aid of human operators.

The objects of this invention are attained by placing groups of stripes on the packages, the stripes having two distinctive colors. A conveyor is provided for carrying the stripes of the packages laterally across two photocells which have optical means for admitting to the cells only light corresponding to said two colors. A counter is coupled to the photocells for converting the binary information contained in the pulses at the output of the photocells into decimal numbers, which decimal numbers may then be employed for operating a display or cash register.

The above-mentioned and other features and objects of this invention and the manner of attaining them will become more apparent and the invention itself will be best understood by reference to the following description of an embodiment of the invention taken in conjunction with the accompanying drawings, wherein.

The first step in marking a package, handled in the marketplace, for reliably labelling the article for automatic inspection comprises, according to this invention, placing marks on the package which will yield reliable binary information. It is to be realized that in the binary number system of "0" and "1," the "0" does not correspond to absence of information. For a reliable inspecting system, the "0" of the number system must be evidenced by positive information, and the "1" evidenced by other and distinct positive information. It is proposed according to this invention to place colored stripes of two distinct colors on the packages to be inspected. It is proposed to arrange the stripes in a plurality of groups, the stripes in each group being arranged so that when read or scanned laterally across the stripes, the stripes represent binary numbers. Hence the groups may be arranged in succession to correspond in position to successively significant decimal numbers.

Figure 1:
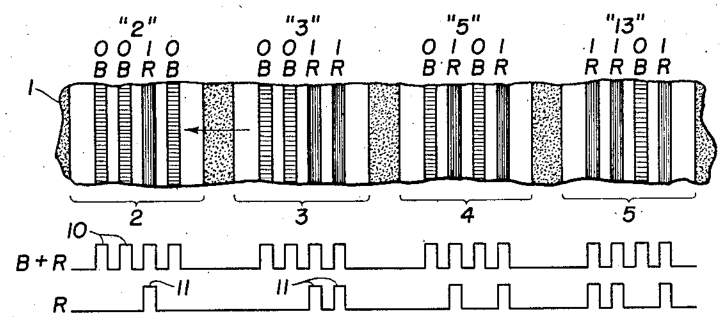
Fig. 1 is a plan view of a section of a package having color coded tapes according to this invention.

In Fig. 1, for example, the package surface 1 is painted or coded with groups of stripes 2, 3, 4, and 5, the stripes in each group being parallel and spaced apart. Each group of stripes may be printed on the package or onto individual tapes 2, 3, 4, and 5. Preferably, the spacing between the groups is greater than the spacing between the stripes of the groups, so that the reading mechanism, to be described, can distinguish between groups. A strip of tape 1 is attached to each package or article to be handled in the merchandising operation, or, alternatively, the stripes may be painted or stamped directly on the surface of the article or its container. The paper tape is so attached to the article that as the article moves on the conveyor of the machine for inspecting the article, the stripes are disposed perpendicularly to the direction of travel. Hence, any photo-electric means for scanning the article will see alternately stripes of either of two colors and blanks.

Let it be assumed that an article is to be labelled with a price of $2.35. Group 2 of stripes must be coded to represent the decimal number "2," in which case the four stripes of group 2 reading from left to right would yield 0010. Any combination of 0's and 1's within the sixteen possible combinations all four binary bits could, of course, be chosen to represent the desired numeral "2." Likewise, the numbers "3" and "5" of $2.35 can be reliably written on the tape by the color coded stripes in groups 3 and 4. The stripes may be of two colors of widely spaced spectral characteristics. The wavelength of red and blue for the stripe colors may be one choice of colors, inasumch as commercial photocells and light filters readily distinguish between these two colors.

In the interest of reliable "reading," it is desirable to scan the tape with one photocell which will respond to either of the two colors, while another photocell will respond to one only of the two colors. According to an important feature of this invention it is relatively simple to illuminate the tape with high level white light and shield the photocells with proper light filters so as to operate the photocells by the stripe-colors, provided that no other markings or optical patterns are present on the articles or packages to disturb the reading of the color-code. In the assumed example, the output of one photocell will yield a distinct direct current pulse 10 as shown in Fig. 1 for each stripe scanned, regardless of the color of the stripe. From the other photocell, pulses 11 are produced and, as will be shown, pulses 10 and 11 when combined in a counter of this invention will reliably register the zeros (0's) and ones (1's) of binary numbers.

The problem of applying price markings in such a way that a reading device can distinguish the price markings from the various color patterns appearing on commercial packages will now be considered. According to this invention, the color stripes used for price markings on the package or on the tape may be made by an ink in which the conventional pigments are replaced by a powder which, under the influence of ultraviolet illumination, luminesce in the visible or invisible range of the spectrum. In place of the previously discussed red and blue stripes, there will therefore be two different kinds of stripes which luminesce in two different spectral ranges when irradiated by ultraviolet light. There are a large variety of phosphor materials available which luminesce in various spectral regions and may be used as pigments for printing two distinctly different types of color stripes. Though the luminescence of those stripes under ultraviolet illumination may not exactly be "red" and "blue," they generally may be only spectrally different. For convenience, however, "red" and "blue" will be hereinafter referred to. While there are many phosphors which have the desired spectral characteristics, mention is made of two. For the blue phosphorescence, hexagonal zinc sulphide, activated with .01% silver, may be used, and for the red phosphorescence zinc or cadmium sulphide activated with a .005% copper may be used. The reading of such stripes painted either directly on the package or article or on tapes glued to the article can then be carried out by conveying the package containing the fluorescent marks through a dark space or a space with reduced visible illumination, and illuminating the marks by an ultraviolet light source. The lower the ambient light level, the greater will be the signal-to-noise ratio at the output of the photocells. It is preferred, of course, that no visible light be reflected from the package surface, with the exception of the fluorescent light, even though patterns on the package may be of brightly colored inks or paints.

There are innumerable phosphors out of which the distinctive colors of the stripes may be made. The spectral characteristics of the phosphorescent material selected should be matched as closely as possible with the characteristics of the photocells. The light-reflecting characteristics of the stripes and their distinctiveness against the tape background will, of course, depend upon the level of daylight, fluorescent or incandescent light in the background. If the photocell inspecting is done at reduced ambient illumination, as under a hood, the requirements of contrast as between the stripes and between the stripes and the background are less severe.

Figure 2:
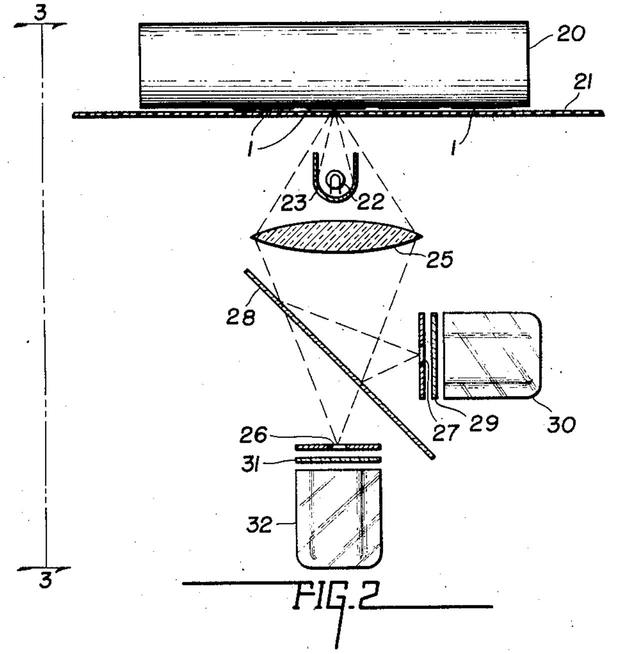
Fig. 2 is a sectional view of one photocell inspecting mechanism of this invention.

One mechanism for inspecting the coded packages according to this invention is shown in Fig. 2, where the package 20 to be inspected is moved from left to right on the conveyor belt 21. With the particular mechanism of Fig. 2, it is assumed the tape 1 with its colored stripes is attached to the bottom of the package and that the inspecting is done from the underside thereof. The light source 22 in a light-tight house (not shown) and a reflector 23 illuminates a spot on or the stripes across the bottom side of the package 20. The conveyor belt may be of transparent plastic, for example, or may have lengthwise slot to expose the underside of the package to the light source. Reflected light from the package is gathered by a lens system, such as the concave-concave lens 25, and focused upon aperture 26 as well as aperture 27 of two light gates. Inclined mirror 28 is of the type which will reflect approximately 50% of the light from lens 25 to aperture 27 while transmitting the other 50% to aperture 26. Alternatively, prisms could be used to divide the reflected light and illuminate the two gates 26 and 27. Light filter 29 is preferably placed on one side of the plate of aperture 27 to admit to the photocell 30 light of the wavelength of one stripe. Filter 31 is placed over photocell 32 so that light of other spectral characteristics is admitted to cell 32. The filter characteristics of filters 29 and 31 are so chosen with respect to the spectral characteristics of the photocells 30 and 32 as to accentuate the light selectivity of the two photocells. Pursuing the example mentioned in Fig. 1, one of the filters 29 would be selected to admit red and blue light or in the alternative could be omitted, while filter 31 would be selected to admit red light only.

Figure 3:
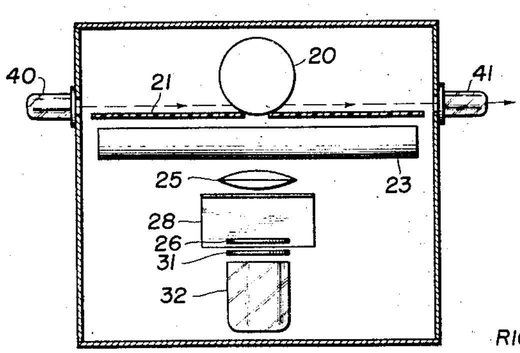
Fig. 3 is a sectional view of the apparatus of Fig. 2 taken on line 3—3 of Fig. 2.

There are two principal causes of error in the inspecting system contemplated in Fig. 2. First, failure may be caused by partial or total loss of the coded tapes 1 from the package. Secondly, the package may be reversed so that as it passes over the reader the binary information is read in reverse. To obviate errors due to loss of price tape codes or attempts at "smuggling," a light gate is provided as shown in Fig. 3 where a source of light 40 and a photocell 41 are aligned on opposite sides of the path the package must travel so that a positive indication is obtained upon the entry of a package to the reader. The output of photocell 41 is interrelated, in the counting mechanism, with the outputs of cells 30 and 32, as will be more fully described hereinafter.

To obviate errors caused by reverse reading, an additional group 5 of stripes (Fig. 1) is added to the tape 1. The fourth group is placed to normally follow the three preceding groups of stripes through the reader. If the binary code for the price information of each group includes all numbers from 0 to 9, the reverse-reading binary number selected for group 5 should consist of a binary number such as 11 or 13, neither of which when read in reverse can be found in the 0 to 9 binary numbers. The particular code arbitrarily assigned to group 5 in Fig. 1 is the number 13, which if read in reverse will initiate a visible or audible alarm. Conversely, when group 5 is read in proper sequence, after groups 2, 3 and 4, the number 13 may operate a read-out relay, to be described, for converting the binary information to decimal information and readying the machine for the next inspection.

Figure 4:
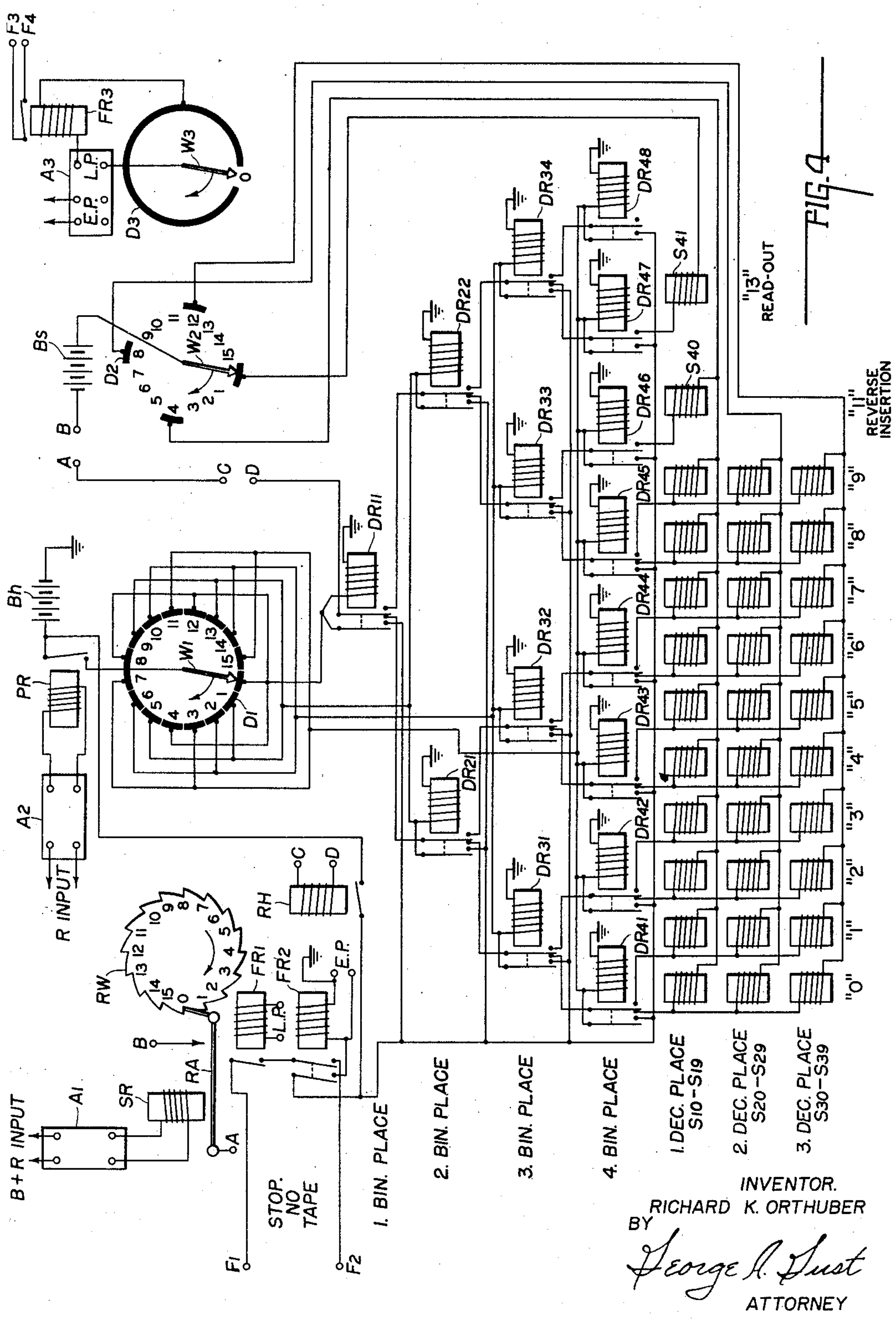
Fig. 4 is a circuit diagram of one binary to decimal converter of this invention.

Fig. 4 shows an example of a counter or decoder which is capable of interpreting the type of pulse information of Fig. 1. The circuitry shown is adapted to convert the binary information received from photocells 30 and 31 into decimal digits of three significant places and to close circuits corresponding to the keyboard circuits of an adding machine. In addition, the circuits operate an alarm as well as a circuit for stopping the conveyor belt when the price code tapes are damaged or missing or when the tape moves through the reader in the reverse direction. All of the circuits of Fig. 4 are in the "at rest" condition which prevails just before a package enters the reading zone. The circuits are adapted to receive the information of Fig. 1 in which one photocell accepts both "red" and "blue" pulses and the other photocell accepts red pulses only.

Amplifiers A–1 and A–2 are coupled respectively to photocells 30 and 32, while the differentiating amplifier A–3 is coupled to photo-tube 41 and is adapted to produce at output terminals "EP" an "entrance pulse" when the light gate 40—41 (Fig. 3) is interrupted. The differentiating amplifier A–3 will produce a "leaving pulse" at terminals "LP" when the light circuit at 40—41, Fig. 3, is reestablished. There are innumerable differentiating circuits which will produce a pulse when a sudden change of voltage occurs as at the output of photo-tube 41.

The output of amplifier A–1 energizes solenoid SR so that by means of the ratchet armature RA, the 16-tooth ratchet wheel RW is advanced one step for each pulse picked up by the $B+R$ photocell. Ratchet wheel RW is keyed to a shaft to which are keyed contact wipers $W_1$, $W_2$ and $W_3$, so that each of the wipers travels sixteen steps per revolution. Each wiper moves over segments of commutators or distributors $D_1$, $D_2$ and $D_3$ respectively. Distributor ring $D_1$ contains 16 separate segments so that wiper $W_1$ always makes contact with one of the segments. In the rest position wiper $W_1$ rides the contact 0.

Distributor $D_2$ contains only four contacts arranged so that wiper $W_2$ makes contact with segment 0 in the rest position and with contacts at positions 4, 8 and 12 of the ratchet wheel. Finally, distributor $D_3$ consists of a ring with a gap at position 0 only. Arranged beneath the distributors of Fig. 4 is shown a group of relays which perform the function of decoding the binary signals picked up by the photocells. These relays are arranged in four horizontal rows, the first row containing one relay $DR_{11}$, the second row containing relays $DR_{21}$ and $DR_{22}$, the third row containing four relays, and the fourth row containing eight relays as shown.

The first, second, third and fourth rows of the decoding relays DR have their solenoids connected to the pulse relay PR, in the output of amplifier $A_2$, through the wiper of distributor $D_1$. At least one decoding relay in each row comprises two mechanically coupled armatures, which in case of interruption of solenoid current return to their rest position, or left-hand position of Fig. 4. One of the armatures, at the right in Fig. 4, makes contact with excited as well as unexcited solenoids. The armature may be termed the decoding armature, since if no R or "red" pulse is received it stays in its left position corresponding to a binary "0." If an R pulse is received, the decoding armature closes on the right contact corresponding to a binary "1." If this position is assumed, the second or holding armature will also make contact and close the solenoids of all the decoding relays of a given row to the terminal of the holding battery $B_h$, provided, however, the holding release relay RH is closed.

Since all ungrounded terminals of the decoding solenoids in each row are connected, it is not necessary that each relay contain a holding armature and contact as shown. It is only necessary that one relay in each horizontal row contain a holding contact.

Across the bottom of Fig. 4 are three horizontal rows of solenoids $S_{10}$–$S_{19}$, $S_{20}$–$S_{29}$, and $S_{30}$–$S_{39}$. These solenoids are adapted to punch the keys of a cash register or to close circuits (not shown) corresponding to the cash register keys. The first horizontal row of the punch-solenoids shall engage with the first vertical column of keys on the cash register keyboard which corresponds in the assumed example to the number of dollars. The second horizontal solenoid row is aligned with the keys corresponding to the number of dimes, and the third row is aligned with the keys corresponding to the number of pennies.

In addition, the first decimal place row contains the solenoid $S_{40}$, which operates when an "11" is read out of the binary information received from the tape and which may operate an alarm to indicate reverse insertion of the package. Solenoid $S_{41}$, also in the first horizontal row, is energized when the binary code "13" is received and which operates the read-out key of the cash register. The remaining circuits of Fig. 4 will become apparent in the following chronological description of a reading cycle of the assumed coded price $2.35. The first three steps on tape 1 of Fig. 1 contain the binary information corresponding to $2.35, the fourth group of stripes corresponding to the binary number "13." The sequences of pulses 10 and 11 of Fig. 1 are fed respectively into relays $A_1$ and $A_2$. The first event in the approach of a package toward the reader will be an interruption of the gate beam of photocell 41 (Fig. 3), and production of an entrance pulse at terminals EP by the differentiating amplifier $A_3$. This will close the contacts of both armatures of the failure relay $FR_2$, which connects the solenoid of $FR_2$ to the holding battery $B_h$ and thus keeps both contacts of $FR_2$ closed as long as the hold-release relay RH is not energized.

The first code pulse received in the example assumed is a "blue" pulse, which energizes only amplifier $A_1$ and moves ratchet wheel RW one step. With the decoding relays in rest position, the point A is connected through the first decoding relay of each row to the upper terminals of the punch-relay solenoids. For "0" the lower terminals of the punch-relay solenoids are disconnected, however, by the position of wiper $W_2$ so that no punch-relay solenoid is energized. It follows that the only consequence of the first blue pulse is the advance of all wipers $W_1$, $W_2$ and $W_3$ by one step.

The second pulse is also a blue pulse, so that amplifier $A_2$ and its connected relay PR remains inactive and the wipers advance a second step.

The third pulse, however, is a "red" pulse and both amplifiers $A_1$ and $A_2$ and their connected relays are energized. It shall be assumed that the pulse relay PR and all decoding relays DR are considerably faster in response than the ratchet wheel. Alternatively, one of the photocells may be shifted slightly in the optical system of Fig. 2 and the same light signal is picked up somewhat earlier by the "R" photocell than by the "$B+R$" photocell. This means that the third pulse in the example will close the contacts of relay PR before the wipers $W_1$ and $W_2$ have time to move to position 3. The solenoids of the third row of the decoding relays are then connected to segment 2 of distributor $D_1$ and are energized by battery $B_h$. Due to the simultaneous establishment of a holding contact, the decoding armatures of the third row are held in their right-hand position after the contacts of PR are opened. This decoding step must be finished before wiper $W_1$ has left the segment 2 of distributor $D_1$.

The fourth pulse in the example is a "B" pulse again, and finally determines the first decimal digit of the price. Again relay PR is not energized and the decoding relays of the fourth row remain at rest. All wipers advance from segment 3 to segment 4 and during the second half of this advancement contact is established between the segment 4 of distributor $D_2$ and wiper $W_2$, thus connecting the lower terminals of all punch-relays (of the first decimal row) to one terminal of battery $B_s$. Shortly before this advance is completed, the ratchet armature completes the contact A—B and the solenoid for the decimal digit 2 is energized by battery $B_s$.

Simultaneously with the energizing of any punch solenoid S, the hold-release relay RH is energized. This relay shall be of the delayed action type, so that its contacts are broken only after the punch solenoid has performed its function to set the cash register key associated with it. The delayed interruption of the RH contact will then de-energize the solenoids of the decoder relays DR so that all of the DR relays return to their left or rest position. In addition, the holding circuit of the failure relay $FR_2$ is interrupted so that its contact which was previously closed by the light gate entrance pulse is now broken. Hence after four steps of the ratchet wheel the decoding of the first decimal place digit is completed. The second decimal place is read similarly, wiper $W_2$ proceeding from position 5 to position 8. While the third decimal place information is decoded, $W_2$ proceeds from position 8 to position 12 and finally advances on to initial position 0 or 16 from position 12 as the read-out number 13 is decoded to operate solenoid $S_{41}$.

If the strip has been started through the reader in the wrong direction, the read-out number 13 is read in reverse which will be decoded by the circuitry of Fig. 4 as binary number "11" whereupon relay $S_{40}$ is energized to operate an alarm and/or stop the conveyor drive motor.

In case the tape has been partially removed so that there are less than 16 pulse signals received from the tape, the wiper $W_3$ will not have proceeded to its correct end position in the gap of the distributor ring and $FR_3$ will be energized by the leave-pulse derived from the photocell gate.

While I have described above the principles of my invention in connection with specific apparatus, it is to be clearly understood that this description is made only by way of example and not as a limitation to the scope of my invention.

What is claimed is:

1. In a system for reading coded information carried by an article on a conveyor, said information being in the form of a plurality of indicia having two different characteristics thereby constituting a binary number code, a decoding system comprising: first photosensitive means arranged to scan said indicia and to provide first signal pulses in response to each indicia; second photosensitive means arranged to scan said indicia and to provide second signal pulses in response to indicia of only one characteristic; and binary-to-decimal converting means connected to said first and second photosensitive means and operable thereby to convert said first and second signal pulses to decimal information.

2. In a system for reading coded information carried by an article on a conveyor, said information being in the form of a plurality of indicia having two different characteristics thereby constituting a binary number code, a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information; and means for indicating the absence of indicia from the article.

3. In a system for reading coded information carried by an article on a conveyor, said information being in the form of a plurality of indicia having two different characteristics thereby constituting a binary number code, a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information; third photosensitive means arranged to sense entrance and exit of the article from the area of scanning of said first and second photosensitive means; and means connected in circuit with said third photosensitive means and operable thereby for indicating absence of indicia from the article.

4. In a system for reading coded information carried by an article on a conveyor, said information being in the form of a first group of indicia having two different characteristics thereby constituting a binary number code and a second group of indicia also having two different characteristics for indicating the correct direction of reading the first group of indicia, a decoding system comprising: first photosensitive means arranged to scan said indicia and to provide first signal pulses in response to each indicia; second photosensitive means arranged to scan said indicia and to provide second signal pulses in response to indicia of only one characteristic; and binary-to-decimal converting means connected to said first and second photosensitive means and operable thereby to convert said first and second signal pulses to decimal information, said binary-to-decimal converting means including means operable in response to scanning by said first and second photosensitive means of one group of indicia ahead of the other group of indicia for indicating incorrect placing of the article on the conveyor.

5. In a system for reading coded information carried by an article on a conveyor, said information being in the form of a plurality of indicia having two different characteristics thereby constituting a binary number code, a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information; and means connected to said binary-to-decimal converting means for registering said decimal information.

6. In a system for reading coded information carried by an article on a conveyor, said information being in the form of a first group of indicia having two different characteristics thereby constituting a binary number code and a second group of indicia also having two different characteristics for indicating the correct direction of reading the first group of indicia, a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information, said binary-to-decimal converting means including means operable in response to scanning by said first and second photosensitive means of one group of indicia ahead of the other group of indicia for indicating incorrect placing of the article on the conveyor; means connected to said binary-to-decimal converting means for registering said decimal information; and means connected to said binary-to-decimal converting means and operable in response to scanning by said first and second photosensitive means of one group of indicia ahead of the other group of indicia for actuating said registering means when the article is correctly placed on the conveyor.

7. In a system for reading coded information carried by an article on a conveyor, said information being in the form of a first group of indicia having two different characteristics thereby constituting a binary number code and a second group of indicia also having two different characteristics for indicating the correct direction of reading the first group of indicia, a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information, said binary-to-decimal converting means including means operable in response to scanning by said first and second photosensitive means of one group of indicia ahead of the other group of indicia for indicating incorrect placing of the article on the conveyor; means connected to said binary-to-decimal converting means for registering said decimal information; and means connected to said binary-to-decimal converting means and operable in response to scanning by said first and second photosensitive means of the groups of indicia in one order for indicating incorrect placing of the article on the conveyor and operable in response to scanning by said first and second photosensitive means of the groups of indicia in the other order for actuating said registering means when said article is correctly placed on the conveyor.

8. In a system for reading coded information carried by an article on a conveyor, said information being in the form of a predetermined number of indicia having two different characteristics thereby constituting a binary number code; a decoding system comprising: first photosensitive means arranged to scan said indicia and to provide first signal pulses in response to each indicia; second photosensitive means arranged to scan said indicia and to provide second signal pulses in response to indicia of only one characteristic; binary-to-decimal converting means connected to said first and second photosensitive means and operable thereby to convert said first and second signal pulses to decimal information; and means operable in response to scanning by said first and second photosensitive means of less than the predetermined number of indicia for indicating absence of the predetermined number of indicia from the article.

9. In a system for reading coded information carried by an article on a conveyor, said information being in the form of at least one group of a plurality of indicia having two different characteristics thereby constituting a binary number code, a decoding system comprising: a first photocell arranged to scan the indicia and to provide first signal pulses in response to each indicia; a second photocell arranged to scan the indicia and to provide second signal pulses in response to indicia of only one characteristic; and a binary-to-decimal converter for converting said first and second signal pulses to decimal information, said converter comprising stepping means connected to said first photocell and actuated thereby to advance one step in response to each said first signal pulse, switching means having a plurality of positions equal in number to the number of the indicia, said switching means being connected to said stepping means and operatively driven thereby so that said switching means advances to the next position responsive to each step of said stepping means, a plurality of groups of circuit establishing means equal in number to the number of indicia in each group of indicia, the first of said groups of circuit establishing means having only one circuit establishing means and each successive group of circuit establishing means having twice the number of circuit establishing means as the preceding group, each of said circuit establishing means having actuating means and deactuated and actuated positions, the actuating means of each of said groups of circuit establishing means being connected to a respective position of said switching means, each said circuit establishing means of each group being connected to one circuit establishing means of the next successive group in its deactivated position and to a different circuit establishing means of the next successive group in its actuated position, said second photocell being connected to said switching means so that a second signal pulse causes actuation of the circuit establishing means connected to the respective position of said switching means, and means connected to the deactuated and actuated positions respectively of the circuit establishing means of the last group of circuit establishing means for indicating the circuit established by said groups of circuit establishing means in response to said first and second signal pulses whereby said binary code is converted to decimal information.

10. In a system for reading coded information carried by an article on a conveyor, said information being in the form of a plurality of groups of indicia, said indicia having two different characteristics thereby constituting a binary number code, a decoding system comprising: a first photocell arranged to scan the indicia and to provide first signal pulses in response to each indicia; a second photocell arranged to scan the indicia and to provide second signal pulses in response to indicia of only one characteristic; and a binary-to-decimal converter for converting said first and second signal pulses to decimal information, said converter comprising stepping means connected to said first photocell and actuated thereby to advance one step in response to each said first signal pulse, switching means having a plurality of positions equal in number to the number of the indicia, the positions of said switching means forming groups corresponding to the groups of said indicia with respective positions of each group being connected together, said switching means being connected to said stepping means and operatively driven thereby so that said switching means advances to the next position responsive to each step of said stepping means, a plurality of groups of circuit establishing means equal in number to the number of indicia in each group of indicia, the first of said groups of circuit establishing means having only one circuit establishing means and each successive group of circuit establishing means having twice the number of circuit establishing means as the preceding group, each of said circuit establishing means having actuating means and deactuated and actuated positions, the actuating means of each of said groups of circuit establishing means being connected to respective positions of said switching means, each said circuit establishing means of each group being connected to one circuit establishing means of the next successive group in its deactivated position and to a different circuit establishing means of the next successive group in its actuated position, said second photocell being connected to said switching means so that a second signal pulse causes actuation of the circuit establishing means connected to the respective position of said switching means, each deactuated and actuated position of the circuit establishing means of the last group of circuit establishing means having a plurality of recorder actuating means connected thereto equal in number to the number of groups of the indicia, and other switching means having a number of positions equal in number to the number of groups of indicia, said positions of said other switching means being respectively connected to corresponding ones of said recorder actuating means, said other switching means being connected to said stepping means and operatively driven thereby so that said positions of said other switching means are respectively reached coincident with the last first signal pulse responsive to the last indicia of each group whereby said recorder actuating means indicate decimal information corresponding to the binary code.

11. In a system for reading coded information carried by an article on a conveyor, said information being in the form of at least one group of a plurality of indicia having two different characteristics thereby constituting a binary number code, a decoding system comprising: a first photocell arranged to scan the indicia and to provide first signal pulses in response to each indicia; a second photocell arranged to scan the indicia and to provide second signal pulses in response to indicia of only one characteristic; and a binary-to-decimal converter for converting said first and second signal pulses to decimal information, said converter comprising stepping means connected to said first photocell and actuated thereby to advance one step in response to each said first signal pulse, switching means having a plurality of positions equal in number to the number of the indicia, said switching means being connected to said stepping means and operatively driven thereby so that said switching means advances to the next position responsive to each step of said stepping means, a plurality of groups of circuit establishing means equal in number to the number of indicia in each group of indicia, the first of said groups of circuit establishing means having only one circuit establishing means and each successive group of circuit establishing means having twice the number of circuit establishing means as the preceding group, each of said circuit establishing means having actuating means and deactuated and actuated positions, the actuating means of each of said groups of circuit establishing means being connected to a respective position of said switching means, each said circuit establishing means of each group being connected to one circuit establishing means of the next successive group in its deactivated position and to a different circuit establishing means of the next successive group in its actuated position, said second photocell being connected to said switching means so that a second signal pulse causes actuation of the circuit establishing means connected to the responsive position of said switching means, means connected to the deactuated and actuated positions respectively of the circuit establishing means of the last group of circuit establishing means for indicating the circuit established by said groups of circuit establishing means in response to said first and second signal pulses whereby said binary code is converted to decimal information; a third photocell arranged to provide a signal responsive to passage of the article through the zone of scanning of said first and second photocells; means connected to said third photocell for providing a first pulse responsive to the article entering said zone and a second pulse responsive to the article leaving said zone; and circuit connections to said last-named means and arranged to provide an indication in response to both of said last-named pulses; said binary-to-decimal converter having means for disabling said last-named circuit connections in response to pulses from said first photocell whereby said last-named indication shows absence of indicia from said article.

12. In a system for reading coded information carried by an article on a conveyor, said information being in the form of a plurality of groups of information-carrying indicia, said indicia having two different characteristics thereby constituting a binary number code, said article further having another group of indicia also having two different characteristics for indicating the correct direction of reading the information-carrying indicia, a decoding system comprising: a first photocell arranged to scan the indicia and to provide first signal pulses in response to each indicia; a second photocell arranged to scan the indicia and to provide second signal pulses in response to indicia of only one characteristic; and a binary-to-decimal converter for converting said first and second signal pulses to decimal information, said converter comprising stepping means connected to said first photocell and actuated thereby to advance one step in response to each said first signal pulse, switching means having a plurality of positions equal in number to the number of the indicia, the positions of said switching means forming groups corresponding to the groups of said indicia with respective positions of each group being connected together, said switching means being connected to said stepping means and operatively driven thereby so that said switching means advances to the next position responsive to each step of said stepping means, a plurality of groups of circuit establishing means equal in number to the number of indicia in each group of indicia, the first of said groups of circuit establishing means having only one circuit establishing means and each successive group of circuit establishing means having twice the number of circuit establishing means as the preceding group, each of said circuit establishing means having actuating means and deactuated and actuated positions, the actuating means of each of said groups of circuit establishing means being connected to respective positions of said switching means, each said circuit establishing means of each group being connected to one circuit establishing means of the next successive group in its deactivated position and to a different circuit establishing means of the next successive group in its actuated position, said second photocell being connected to said switching means so that a second signal pulse causes actuation of the circuit establishing means connected to the respective position of said switching means, each deactuated and actuated position of the circuit establishing means of the last group of circuit establishing means having a plurality of recorder actuating means connected thereto equal in number to the number of groups of the indicia, other switching means having a number of positions equal in number to the number of groups of indicia, said positions of said other switching means being respectively connected to corresponding ones of said recorder actuating means, said other switching means being connected to said stepping means and operatively driven thereby so that said positions of said other switching means are respectively reached coincident with the last first signal pulse responsive to the last indicia of each group whereby said recorder actuating means indicate decimal information corresponding to the binary code; reverse insertion indicating means connected between the actuated position of one of the circuit establishing means of said last group of circuit establishing means and the first position of said other switching means for providing indication of incorrect placing of the article on the conveyor in response to scanning by said first and second photocells of the other group of indicia ahead of the information-carrying groups; and read-out means connected between the actuated position of another circuit establishing means of said last group of circuit establishing means and the last position of said other switching means for providing an indication of correct placing of the article on the conveyor in response to scanning by said first and second photocells of the other groups of indicia after the information-carrying groups.

13. In a system for reading coded information carried by an article on a conveyor, said information being in the form of at least one group of a predetermined number of indicia having two different characteristics thereby constituting a binary number code; a decoding system comprising: a first photocell arranged to scan the indicia and to provide first signal pulses in response to each indicia; a second photocell arranged to scan the indicia and to provide second signal pulses in response to indicia of only one characteristic; and a binary-to-decimal converter for converting said first and second signal pulses to decimal information, said converter comprising stepping means connected to said first photocell and actuated thereby to advance one step in response to each said first signal pulse, switching means having a plurality of positions equal in number to the number of the indicia, said switching means being connected to said stepping means and operatively driven thereby so that said switching means advances to the next position responsive to each step of said stepping means, a plurality of groups of circuit establishing means equal in number to the number of indicia in each group of indicia, the first of said groups of circuit establishing means having only one circuit establishing means and each successive group of circuit establishing means having twice the number of circuit establishing means as the preceding group, each of said circuit establishing means having actuating means and deactuated and actuated positions, the actuating means of each of said groups of circuit establishing means being connected to a respective position of said switching means, each said circuit establishing meaans of each group being connected to one circuit establishing means of the next successive group in its deactivated position and to a different circuit establishing means of the next successive group in its actuated position, said second photocell being connected to said switching means so that a second signal pulse causes actuation of the circuit establishing means connected to the respective position of said switching means, means connected to the deactuated and actuated positions respectively of the circuit establishing means of the last group of circuit establishing means for indicating the circuit established by said groups of circuit establishing means in response to said first and second signal pulses whereby said binary code is converted to decimal information; another switching means connected to said stepping means and operatively driven thereby, said other switching means being arranged to complete a circuit in every position of said stepping means except the last; a third photocell arranged to provide a pulse responsive to exit of the article from the zone of scanning of said first and second photocells; and means connected in circuit with said third photocell and said other switching means for providing an indication of scanning by said first and second photocells of less than the predetermined number of indicia.

14. In combination an article having a group of marks, each mark having either one of two distinct colors, a first photocell and optical system being responsive only to either of said two colors, a second photocell and optical system responsive to one only of said colors, means to scan said marks with said photocells, a stepping magnet and ratchet wheel coupled electrically to said first photocell, a commutator with a wiper and segments corresponding in number to the number of said marks, a binary-to-decimal converter connected to said segments, means for driving said wiper by said ratchet wheel, means for connecting said wiper to one of said photocells, and means for connecting said stepping magnet to the other of said photocells.

References Cited in the file of this patent

UNITED STATES PATENTS

| | | |
|---|---|---|
| 831,591 | Aylsworth | Sept. 25, 1906 |
| 1,937,303 | Worrall | Nov. 28, 1933 |
| 2,268,498 | Bryce | Dec. 30, 1941 |
| 2,387,512 | Hilberg | Oct. 23, 1945 |
| 2,444,042 | Hartley et al. | June 29, 1948 |
| 2,612,994 | Woodland et al. | Oct. 7, 1952 |